Aug. 18, 1970   J. FARNAM   3,524,661
CONNECTION FOR STEEL AND PLASTIC PIPE
Filed Jan. 8, 1969

INVENTOR.
JACK FARNAM
BY
*Head & Johnson*
ATTORNEYS

United States Patent Office 3,524,661
Patented Aug. 18, 1970

3,524,661
CONNECTION FOR STEEL AND PLASTIC PIPE
Jack Farnam, Tulsa, Okla., assignor, by mesne assignments, to W & R Industries, Inc., Tulsa, Okla., a corporation of Oklahoma
Filed Jan. 8, 1969, Ser. No. 789,715
Int. Cl. F16l 33/18
U.S. Cl. 285—239                                      15 Claims

ABSTRACT OF THE DISCLOSURE

Plastic pipe of the type capable of being cold extruded is connected to a threaded and grooved metal pipe end by a sleeve which extrudes the plastic pipe into the threads and groove. Internal connections are also possible.

BACKGROUND OF THE INVENTION

This invention relates to the art of interconnecting metal to non-metal pipe joints. More particularly it relates to a coupling for metallic and plastic pipe, the latter of which is of a type capable of being cold-extruded.

High strength plastic pipe such as polyethylene or polypropylene plastics are becoming more commonplace, as pipelines for fluids, especially in the domestic or home usage for gas and/or water lines. In many instances, however, it is necessary that a strong safe connection be made between the end of the plastic pipe and the more rigid and standard metallic pipe. The art heretofore has been primarily concerned with connecting more resilient members, such as rubber hose, with metallic coupling and does not teach adequate and safe connections for metal to plastic pipe for use under conditions such as the home or domestic market.

SUMMARY

This invention provides a connection for metal to plastic pipe wherein the metal portion includes grooves or threads about which the plastic pipe is positioned. The threads or grooves terminate in a single circumferential groove. An extrusion or compression ring is forced about the plastic pipe such that the plastic pipe is cold-extruded into the groove or thread spaces to form an interlocking member. In some instances epoxy type glues or sealants may be applied to the grooves and/or threads before assembly.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Figure 1:
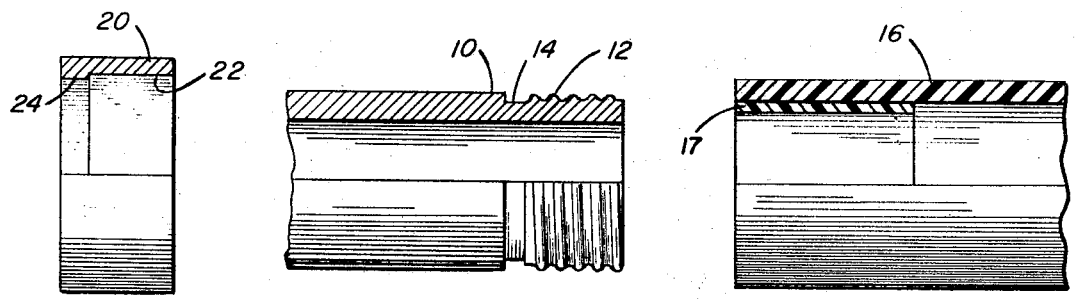
FIG. 1 is an exploded view partly in cross section, showing a section of plastic tubing, the end joint of metallic pipe and the extrusion ring.
Figure 2:
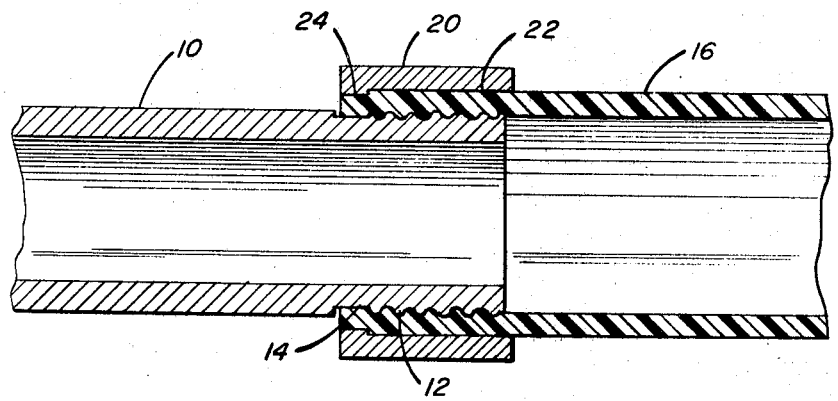
FIG. 2 is a sectional view of the members of FIG. 1 in their assembled position.

Referring to the drawing and in particular to FIGS. 1 and 2 the assembled coupling or transition fitting of this invention comprises a metal pipe joint 10 the end of which is formed with grooves or threads, preferably relatively shallow round threads, 12 which extend from the pipe end to an undercut or groove 14. As a specific example, standard metal pipe is used wherein grooves or threads 12 preferably are of design having a radius at the top and the bottom. For example a radius of .035 inch, a thread depth of .027 inch and a pitch of .111 inch or nine threads per inch is preferred. The undercut groove 14 is preferably made at approximately .010 to .020 inch below the root diameter of the threads 12. Although the threads 12 are preferably of a screw helix, it is understood circular rounded grooves may also be used. The screw helix thread type permits the relatively close fitting plastic tubing 16 to be easily inserted to a position where the end of the tubing 16 terminates above the groove 14.

The plastic tubing, is to be of a material capable of being cold formed or extruded and materials such as polyethylene or polypropylene are inclusive of this invention.

In assembly, an extrusion or compression ring 20 is pre-positioned about pipe 10, properly oriented. The tubing 16 is inserted over the threads 12 and groove 14. In some instances it may be preferred to coat the interior of the pipe end 16 or the thread and groove portions 12 and 14 respectively with an epoxy glue or resin material 17 before assembly. Thereafter extrusion or compression ring 20 which is retained about the metal pipe 10 in the position shown in FIG. 1, is forced over the plastic 16 resulting in an ultimate assembly as shown in FIG. 2. The extrusion ring 20 basically comprises coaxial and adjacent internal peripheral surfaces 22 and 24. In the preferred embodiment surface 22 is of diameter relative to the outside diameter of pipe 16 to cause about .020 inch of interference over that portion of threads 12 while surface 24, of smaller diameter, is adapted to provide .040 inch of interference over that portion of the groove or undercut 14. Forcing of the extrusion ring 20 over the assembled plastic pipe 16 and metal pipe 10 cold forms or extrudes the plastic tubing into the threads 12 and groove 14.

Figure 3:
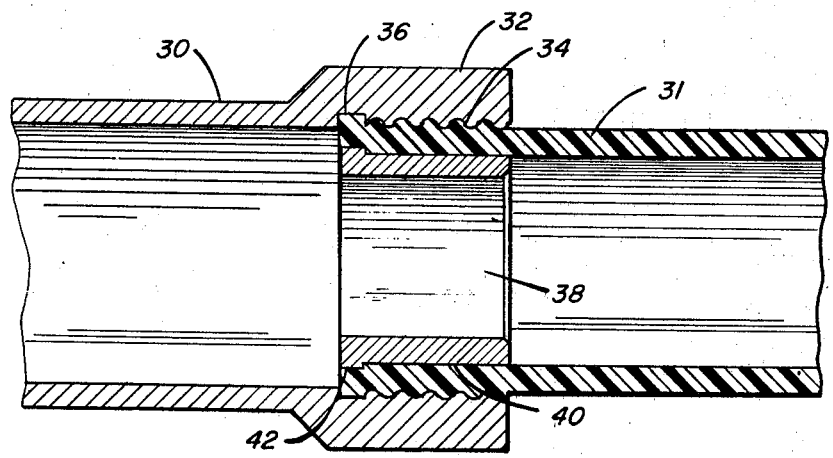
FIG. 3 is a sectional view of an alternate embodiment of this invention.

Referring now to the embodiment of FIG. 3 an internal connection using the principles of this invention is applied to a metal pipe 30 having, in this instance, a swaged or upset end portion 32. The upset portion is internally threaded at 34 with the preferred round type threads similar to that described in FIGS. 1 and 2. Terminating the threads is an internal recess or groove portion 36. An internal compression or extrusion ring 38 is adapted, around its exterior periphery to have surfaces 40 and 42 provide the respective interference fit, previously described, relative to and over threaded portion 34 and recess or groove 36.

In the usage of this invention it has been found that the coupling is particularly useful as a transition fitting relative to meter risers as used with fluid supply lines, such as fuel gas lines. That is, in a typical embodiment where a meter, includes metal pipe riser portions for the inlet connecting with the main gas line and a metallic line from the outlet from the meter to connect with the user's inlet. With the increase use of synthetic resin or plastic pipelines connecting to the user's inlet this coupling of the riser outlet (or could be the inlet in some cases) to the plastic pipe provides a readily available and easily connected fitting.

What is claimed:

1. A metal pipe to plastic pipe transition connection comprising:
    a straight end metal pipe including a first series of external grooves extending from adjacent the end of said pipe to a second circumferential groove, a straight end plastic pipe being of a cold extrudible material and a portion extending circumferentially about said first grooves and said second groove, and a cylindrical sleeve extending circumferentially about said portion of said plastic pipe, said cylindrical sleeve having a first internal peripheral surface of substantially uniform diameter interference fitted about said plastic pipe so as to extrude said plastic pipe into said first grooves and a second internal peripheral surface of substantially uniform diameter, of greater interference fit than said first, over that portion of said plastic pipe over said second circumferential groove.

2. A connection of claim 1 wherein said external grooves are threads.

3. A connection of claim 2 wherein said threads are round.

4. A connection according to claim 1 wherein the diameter of said second circumferential groove is less than the minimum diameter of said first grooves.

5. A connection according to claim 1 wherein the diameter of said second circumferential groove is about .010 to .020 inch below the minimum diameter of said first grooves.

6. A connection according to claim 4 wherein said sleeve includes internal peripheral portions, coaxial and side by side, to respectively provide about .020 inch interference fit with said plastic pipe over that portion having said threads and .040 inch interference fit at that portion over said circumferential groove.

7. A connection according to claim 6 wherein said plastic pipe is polyethylene.

8. A connection according to claim 6 including epoxy resin sealer between said metal and plastic pipe.

9. A metal pipe to plastic pipe connection comprising:
a metal pipe including a first series of internal grooves extending from the end of said pipe to a second internal circumferential groove, a plastic pipe of cold extrudible material and a portion extending so as to be coaxial internally to said first grooves and said second circumferential groove, and a cylindrical sleeve extending coaxially internally about a said portion of said plastic pipe, said sleeve having a first external peripheral surface of substantially uniform diameter interference fitted into said plastic pipe so as to extrude said plastic pipe outwardly into said first grooves and a second external peripheral surface of substantially uniform diameter, of greater interference fit than said first, over that portion of said plastic pipe over said second circumferential groove.

10. A connection of claim 9 wherein said internal grooves are threads.

11. A connection of claim 10 wherein said threads are round.

12. A connection according to claim 9 wherein said second circumferential groove is about .010 to .020 inch below the maximum diameter of said first grooves or threads.

13. A connection according to claim 12 wherein said sleeve includes external peripheral portions, coaxial and side by side, to respectively provide about .020 inch interference fit with said plastic pipe over that portion having said threads and .040 inch interference fit at that portion over said circumferential groove.

14. A connection according to claim 13 wherein said plastic pipe is polyethylene.

15. A connection according to claim 13 including epoxy resin sealer between said metal and plastic pipe.

References Cited

UNITED STATES PATENTS

| | | | |
|---|---|---|---|
| 2,290,776 | 7/1942 | Stillwagon | 285—242 X |
| 2,424,863 | 7/1947 | Swain | 285—242 X |
| 3,408,099 | 10/1968 | Appleton | 285—247 |

FOREIGN PATENTS

| | | |
|---|---|---|
| 810,335 | 8/1951 | Germany. |
| 1,158,777 | 12/1963 | Germany. |
| 1,158,779 | 12/1963 | Germany. |
| 808,984 | 2/1959 | Great Britain. |

DAVE W. AROLA, Primary Examiner

U.S. Cl. X.R.

285—259